(12) United States Patent
Huang et al.

(10) Patent No.: US 8,333,512 B2
(45) Date of Patent: Dec. 18, 2012

(54) SELF-COMPENSATING HYDROSTATIC PLANAR BEARING DEVICE AND METHOD THEREOF

(75) Inventors: Hua-Chih Huang, Taichung (TW); Po-Chun Yaung, Pingtung County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 342 days.

(21) Appl. No.: 12/778,876

(22) Filed: May 12, 2010

(65) Prior Publication Data

US 2010/0290724 A1   Nov. 18, 2010

(30) Foreign Application Priority Data

May 13, 2009   (TW) ................................ 98115776 A

(51) Int. Cl.
*F16C 32/06* (2006.01)
(52) U.S. Cl. ......................................................... 384/12
(58) Field of Classification Search .................... 384/12, 384/100
See application file for complete search history.

(56) References Cited

U.S. PATENT DOCUMENTS

| | | | |
|---|---|---|---|
| 3,610,365 A * | 10/1971 | Maddox et al. | 384/12 |
| 3,653,458 A * | 4/1972 | Donlon | 180/124 |
| 3,931,948 A | 1/1976 | Mason, Jr. | |
| 3,934,948 A | 1/1976 | Pruvot | |
| 4,045,098 A | 8/1977 | Blondeel | |
| 4,413,864 A | 11/1983 | Phillips | |
| 4,560,213 A | 12/1985 | Enderle et al. | |
| 5,104,237 A | 4/1992 | Slocum | |
| 5,106,204 A * | 4/1992 | Dunham | 384/12 |
| 5,281,032 A | 1/1994 | Slocum | |
| 5,484,208 A | 1/1996 | Kane et al. | |
| 5,533,814 A | 7/1996 | Slocum | |
| 5,700,092 A | 12/1997 | Wasson et al. | |
| 5,980,110 A | 11/1999 | Lyon | |

(Continued)

FOREIGN PATENT DOCUMENTS
DE   19603218 A1   7/1997
(Continued)

OTHER PUBLICATIONS

Intellectual Property Office, Ministty of Economic Affairs, R.O.C. "Office Action", Jan. 10, 2012, Taiwan.

(Continued)

*Primary Examiner* — Thomas R Hannon
(74) *Attorney, Agent, or Firm* — Morris Manning & Martin LLP; Tim Tingkang Xia, Esq.

(57) ABSTRACT

A self-compensating hydrostatic planar bearing device comprises: a flow restrictor, disposed on a slide-table, having a flexible supporting unit extendedly formed on an end thereof; a first chamber, formed on another end of the flow restrictor opposite to that of the flexible supporting unit for communicating with a pipe disposed penetrating through the flow restrictor; and a second chamber, formed between the supporting unit and the slide-table for communicating with the first chamber through a communication hole. Operationally, when the load is changing, the pressure to the first chamber will be changing accordingly while the pressure change will be transferred to the second chamber through the communication hole for causing the flexible supporting unit to deform and thereby further causing the volume of the first chamber to change so that the pressure of the first chamber is consequently changed therewith and thus accomplishes a self-compensating process of the bearing's stiffness.

13 Claims, 6 Drawing Sheets

U.S. PATENT DOCUMENTS 6,012,845 A   1/2000   Lyon

FOREIGN PATENT DOCUMENTS

| | | | |
|---|---|---|---|
| GB | 1509709 | A | 5/1978 |
| GB | 2248892 | A | 4/1992 |
| JP | 51064145 | A | 6/1976 |
| TW | 435268 | Y | 5/2001 |
| TW | 435628 | U | 5/2001 |
| TW | 225576 | B | 12/2004 |
| TW | 304221 | Y | 1/2007 |
| WO | 9953207 | A1 | 10/1999 |

OTHER PUBLICATIONS

European Patent Office, "Search Report", Nov. 17, 2011. Europe.
Japan Patent Office, "Office Action", May 29, 2012, Japan.
European Patent Office, "Office Action", Sep. 6, 2010, Germany.

* cited by examiner

SELF-COMPENSATING HYDROSTATIC PLANAR BEARING DEVICE AND METHOD THEREOF

CROSS-REFERENCE TO RELATED APPLICATIONS

This non-provisional application claims priority under 35 U.S.C. §119(a) on Patent Application No(s). 098115776 filed in Taiwan, R.O.C. on May 13, 2009, the entire contents of which are hereby incorporated by reference.

FIELD OF THE INVENTION

The present invention relates to a self-compensating hydrostatic planar bearing device and the method thereof, and more particularly, to a hydrostatic planar bearing device and method capable of overcoming the phase lag of the restrictor's reaction to bearing oil film changes by a sort of local servo-compensation of the bearing gap geometry.

BACKGROUND OF THE INVENTION

Hydrostatic slideway systems are commonly used as a work-table or a tool-table of metal-cutting machine tools. A hydrostatic slideway system includes a guideway unit having a pair of guide rails formed on an upper surface of a machine bed, and a slide-table unit having plural oil pockets formed respectively on a lower surface and a side wall of the slide-table unit. Hydrostatic bearing is well known for its inherently frictionless movement, owing to its capability of maintaining a fixed fluid film gap by supplying externally pressurized fluid into the bearing surfaces and avoiding the direct surfaces contact. Generally, a typical hydrostatic slideway system is composed of hydrostatic bearings, an external oil supply system and flow restrictors.

The pocket configuration can have great influence upon the performance of a hydrostatic bearing in various aspects, such as the flow rate, the maximum height limit, supporting capability, damping behavior and stiffness. There are several common types of pocket configuration used in the hydrostatic bearing, which are shallow pocket type, deep pocket type, groove type and island type, etc.

The external oil supply system, being an essential component of hydrostatic slideway system, is used to provide steady, temperature-stable and clean pressurized oil to the hydrostatic bearings.

Flow restrictors of hydrostatic bearings can be divided into two categories. One of which is the fixed restrictor, such as the capillary restrictors, the orifice restrictors, and the other is the variable restrictor, such as flow valve, pressure-sensing valve and membrane (or diaphragm) restrictor. As the fixed restrictors are easy to manufacture, they are vastly used in the hydrostatic slide way system. Flow valves, on the other hand, have been claimed to lead to considerable enhancement of the stiffness, nearly infinite value in a close neighbourhood of the working point. However, besides being costly, flow valves can be problematic in many ways. Without the use of restrictor, the corresponding hydrostatic bearings in the hydrostatic slide system will not be able to provide any stiffness and supporting ability. That is, by configuring the hydrostatic bearings in a hydrostatic slide system with matching restrictors, the maximal possible stiffness of the hydrostatic bearings can be provided.

Currently, the studies relating to the hydrostatic planar bearing are mostly focusing on the improvement of its pocket configuration and also on its restrictor configuration as well for the purpose of improving the performance of the hydrostatic planar bearing with regard to its load carrying capacity, maximum allowable speed limit, damping property and stiffness.

There exists some shortcomings of hydrostatic planar bearing in current hydrostatic slideway system:

(1) As the hydrostatic slideway system is designed with specific bearing pocket configuration and flow restrictor type. Its stiffness is of fixed value and is independent to external loading. While designing the hydrostatic bearing with the other pocket configuration and restrictor type, the bearing performance characteristics must be re-calculated theoretically.

(2) In the oil supply circuit of the traditional hydrostatic bearings, the restrictors are placed upstream of the feed hole of the bearing. For one thing, those restrictors cannot be installed sufficiently close to the bearing pocket's inlet, which results in time delay of their reaction to bearing film changes. Thus, ideally, the compensation ought to find place in the bearing gap itself.

There are already some studies for improving the aforesaid shortcomings. One of which is an aerostatic linear bearing with compensating device for aerostatic slide system disclosed in TW Pat. Pub. No. 435628. In this patent, a linear bearing is so configured that its use seven adjusting screws to define three surfaces of the same, that is, three for a vertical surface of the linear bearing and two for one side surface while another two for another side surface of the linear bearing. By adjusting the seven adjusting screws manually, the gap between the bearing race and the guide rail can be adjusted for compensating the load variation to the aerostatic linear bearing. Although the aforesaid patent is feasible, it is unsatisfactory in both accuracy and reliability.

Another study is disclosed in TW. Pat. Pub. No. 225576 and U.S. Pat. No. 5,104,237, entitled "Self-compensating hydrostatic linear motion bearing". In this study, there are a pair of hydrostatic bearings arranged opposite to each other at the two sides of a guide rail that are connected respectively to an oil pouch by their corresponding oil channels. As a load is applied, the oil film clearances between the bearing carriage surfaces facing the guide rail will change according, and then the pressure difference between the oil films in the two gaps is compensated by the use of the oil pouch since it is able to communicate with the two bearings through the oil channels at the same time. Thus, self-compensation is provided. However, as oil pouch might respond quite slowly for compensating the pressure difference, the aforesaid design is not suitable for miniature slide systems.

Moreover, there is an integrated self-compensating hydrostatic bearing disclosed in U.S. Pat. No. 5,533,814, entitled "Low profile self-compensating hydrostatic thrust bearing", U.S. Pat. No. 5,700,092, entitled "Integrated shaft self-compensating hydrostatic bearing", U.S. Pat. No. 3,934,948 entitled "Self-pressurized and self-compensating hydrostatic bearing", U.S. Pat. No. 5,281,032, entitled "Self-compensating hydrostatic bearing for supporting shafts and spindles and like for rotary and translational motion and method thereof", U.S. Pat. No. 5,484,208, entitled "Elastically supported self-compensating flow restrictors for optimizing hydrostatic bearing performance" and TW Pat. Pub. No. 304221. In the aforesaid patents, there is a pair of hydrostatic bearings arranged opposite to each other at the two sides of a guide rail while being connected to each other by a groove, by that fluid is able to flow freely between the two opposite-arranged hydrostatic bearings. As a load is applied, the oil film clearances between the bearing carriage surfaces facing the guide rail will change according, and then the pressure difference between the oil films in the two gaps is compensated through the fluid communication in the groove. Thus, self-compensation is provided. However, pressure difference capable being compensated by the aforesaid design is limited to a very small range.

In addition, there is a self-compensating hydrostatic bearing disclosed in U.S. Pat. No. 5,980,110, entitled "Manifold for self-compensating hydrostatic bearing with integral", U.S. Pat. No. 6,012,845, entitled "self-compensating hydrostatic bearing with tape" and PCT Pat. No. WO 99/53207, entitled "self-compensating hydrostatic bearing". In the aforesaid patents, there is a pair of hydrostatic bearings arranged opposite to each other at the two sides of a guide rail while being connected to each other by a groove configured with a valve, by that fluid is able to flow freely between the two opposite-arranged hydrostatic bearings through the groove under the control of the valve. As a load is applied, the oil film clearances between the bearing carriage surfaces facing the guide rail will change according, and then the pressure difference between the oil films in the two gaps is compensated through the fluid communication in the groove under the control of the valve. Thus, self-compensation is provided. However, the oil circuit system for the aforesaid self-compensating hydrostatic bearing can be very complex and thus costly.

SUMMARY OF THE INVENTION

The object of the present invention is to provide a self-compensating hydrostatic planar bearing device and the method capable of overcoming the phase lag of the restrictor's reaction to bearing oil film changes by a sort of local servo-compensation of the bearing gap geometry.

To achieve the above object, the present invention provides a self-compensating hydrostatic planar bearing device and method thereof, in which the device comprises: a flow restrictor, disposed on a slide-table and having a flexible supporting unit formed on an end thereof extruding out from the slide-table; a first chamber, forming on another end of the flow restrictor opposite to that where the flexible supporting unit is disposed while enabling the first chamber to communicate with a pipe disposed penetrating through the flow restrictor; and a second chamber, formed at a position between the supporting unit and the slide-table while allowing the same to communicate with the first chamber through the communication holes on the first chamber.

Operationally, when the load to the aforesaid bearing device is changing, the pressure to the first chamber will be changing accordingly while the pressure change will be transferred to the second chamber through the communication holes for causing the flexible supporting unit to deform slightly and thereby further causing the volume of the first chamber to change so that the pressure of the first chamber is consequently changed therewith and thus accomplishes a process for self-compensating the stiffness of the bearing.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
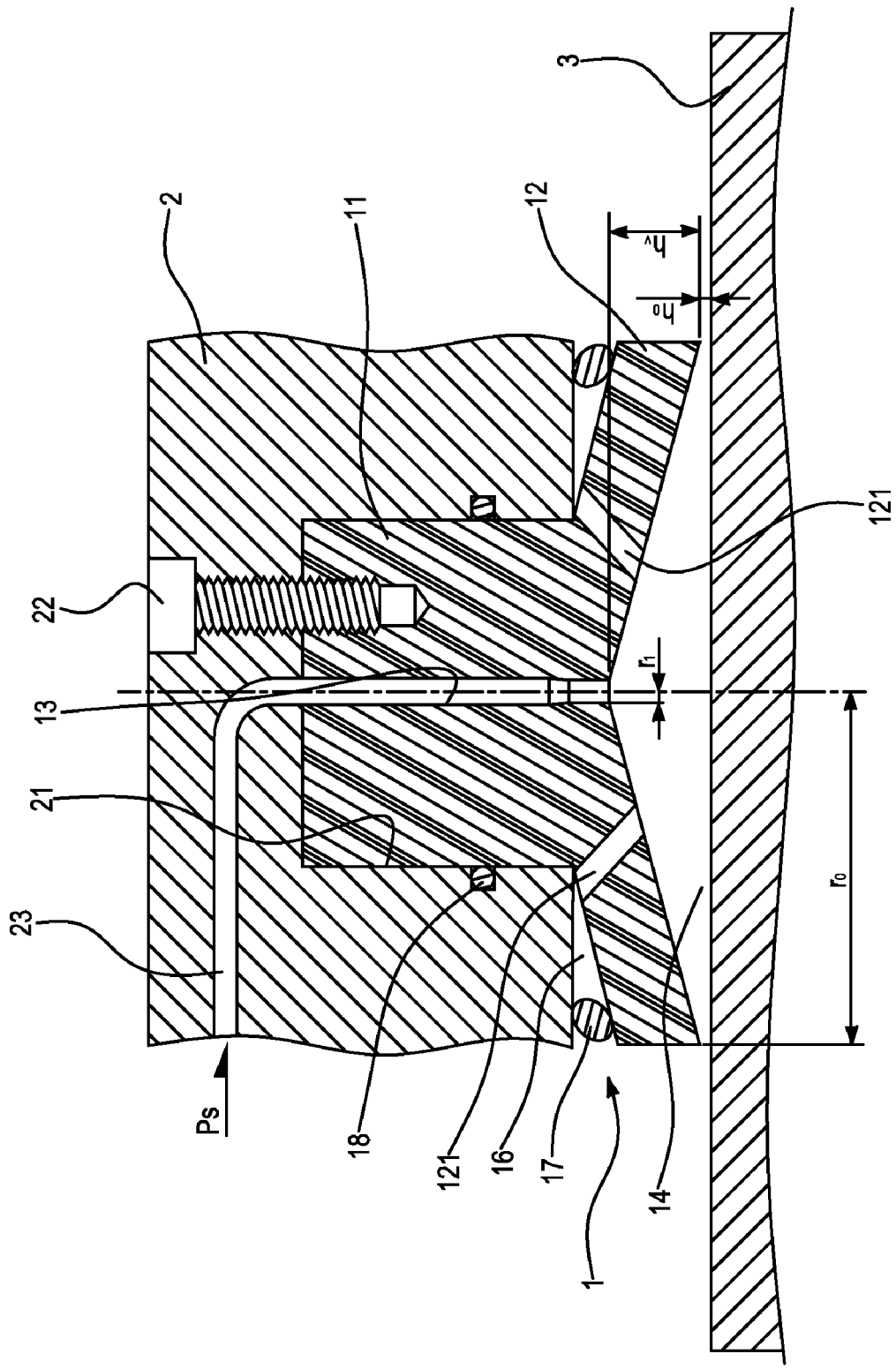
FIG. 1 is a sectional view of a self-compensating hydrostatic planar bearing device according to an embodiment of the invention.

Please refer to FIG. 1, which is a sectional view of a self-compensating hydrostatic planar bearing device according to an embodiment of the invention. In of FIG. 1, the hydrostatic planar bearing device 1 is sandwiched between a slide-table 2 and a guide rail 3. In fact, depending on its size, there can be a plurality of such hydrostatic planar bearing device 1 being sandwiched between the slide-table 2 and the guide rail 3 for enabling the slide-table 2 to slide smoothly along the guide rail 3.

The hydrostatic planar bearing device 1 is configured with a flow restrictor 11, which is fitted inside a groove 21 formed on the slide-table 2 and is fixed therein by a fixing part 22, such as a screw bolt. It is noted that the groove 21 is formed on the slide-table 2 at a side thereof that is adjacent to the guide rail 3, and the hydrostatic planar bearing device 1 is disposed to abut against the guide rail 3 while enabling an extending end of the flow restrictor 11 that is extending out of the slide-table 2 and toward the guide rail 3 to be formed as a flexible supporting unit 12. In this embodiment, the flexible supporting unit is a cone-shaped structure composed of membranes and is integrally formed with the flow restrictor 11, but is not limited thereby. Moreover, there is a sunken first chamber 14 formed on the supporting unit 12 at a side thereof facing toward the guide rail 3 and there is a second chamber 16 formed at a position between slide-table 2 and the supporting unit 12. In addition, there is a pipe 13 formed inside the flow restrictor while penetrating the same to communicate with the first chamber 14; and by connecting an end of the pipe 13, that is opposite to the one connected to the first chamber 14, to a duct 23 formed in the slide-table 2, the pipe 13 can be connected to an external fluid supply.

The support unit 13 can be formed with more than one communication holes 121 as each of such holes 121 are formed penetrating the supporting unit 12 for enabling the second chamber 16 to communicate with the first chamber 14.

In this embodiment, as the supporting unit 12 is shaped as a cone, the second chamber 16 can be insulated into an enclosed area by the use of a first sealing component 17 and a second component 18 as the first sealing component 17 is disposed wrapping around the periphery of the second chamber 16 while the second sealing component 18 is disposed at a position between the edge of the flow restrictor 11 and the slide-table 2.

In the embodiment shown in FIG. 1, the flow restrictor 11 is formed as a cylinder and the supporting unit 12 is shaped as a cone while the second chamber 16 is a ring-like structure, but they are not limited thereby. For instance, the flow restrictor 11 can be a rectangular column, or columns of other regular or irregular geometrical shapes; the supporting unit 12 can be shaped as a disc, a rectangle or any regular or irregular polygons, and thus in consequence to the shapes of the flow restrictor 11 and supporting unit 12, the second chamber 16 can be formed in shapes other than the aforesaid ring-like structure.

Figure 2:
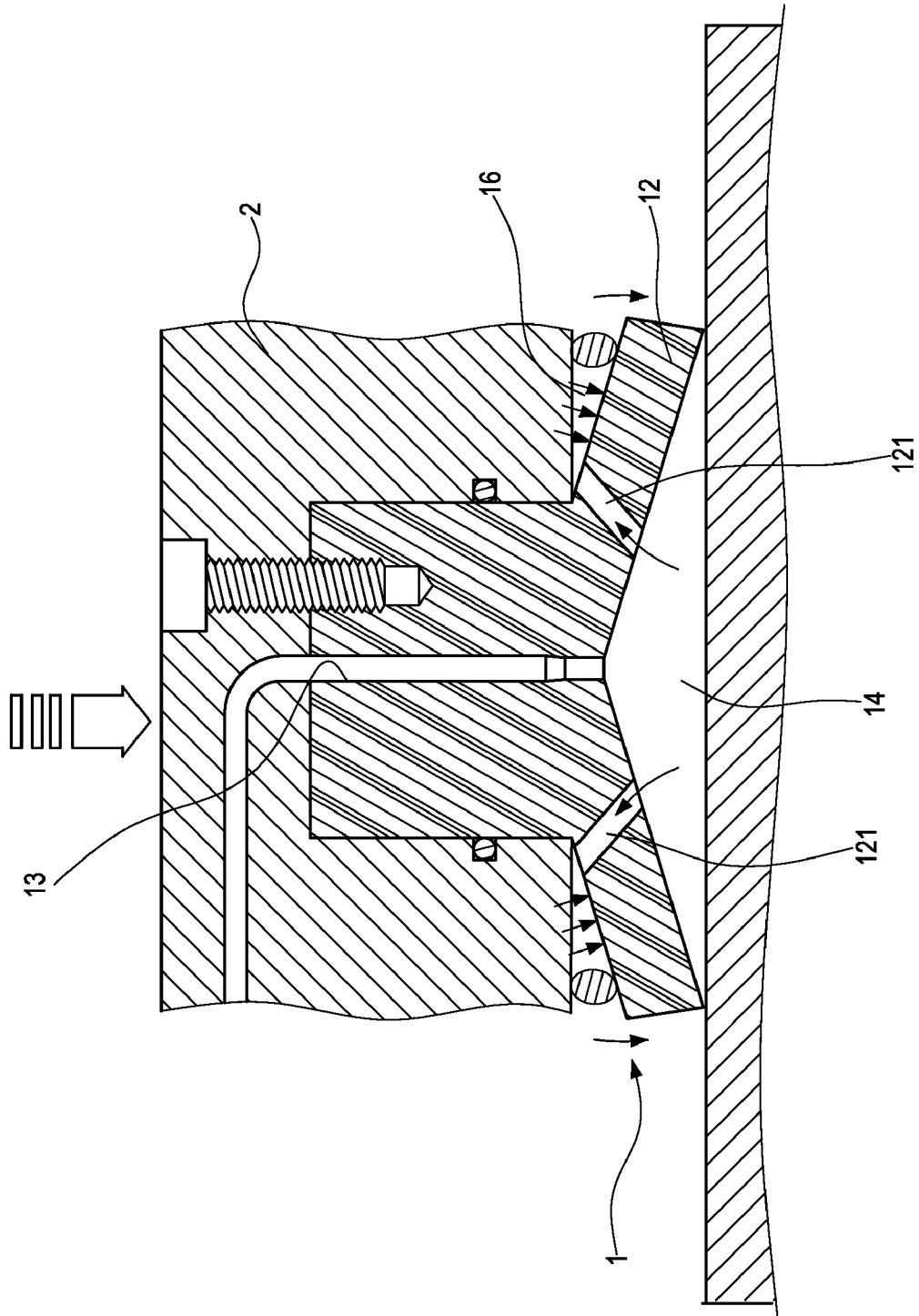
FIG. 2 is a schematic diagram illustrating how a self-compensating process is performed inside a hydrostatic planar bearing of FIG. 1 in response to an increasing load on the top.

Please refer to FIG. 2, which is a schematic diagram illustrating how a self-compensating process is performed inside a hydrostatic planar bearing of FIG. 1 in response to an increasing load. Operationally, when the load to the aforesaid bearing device 1 that is being transferred thereto through the slide-table 2 is increasing, the pressure on the hydrostatic planar bearing device 1 will narrow the oil film clearance between the supporting unit 12 and the guide rail 3 and also cause the pressure at the downstream of the pipe 13 as well as the pressure of the first chamber 14 to increase. Such pressure increasing will be transfer simultaneously to the second chamber 16 through the communication hole 121 for causing the cone-shaped supporting unit 12 to deform in a manner that the degree of convergence relating to the oil film is increasing, i.e. the taper is increasing, and thereby further causing the volume of the first chamber 14 to decrease so that the average pressure of the first chamber 14 is consequently increased therewith for forcing the hydrostatic planar bearing device 1 to move in a direction opposite to the aforesaid increasing load, and thus accomplishing a self-compensating process to increase the stiffness of the hydrostatic planar bearing device 1. Similarly, when the load is decreasing, the stiffness of the hydrostatic planar bearing device 1 will be decreased accordingly as well.

Figure 3:
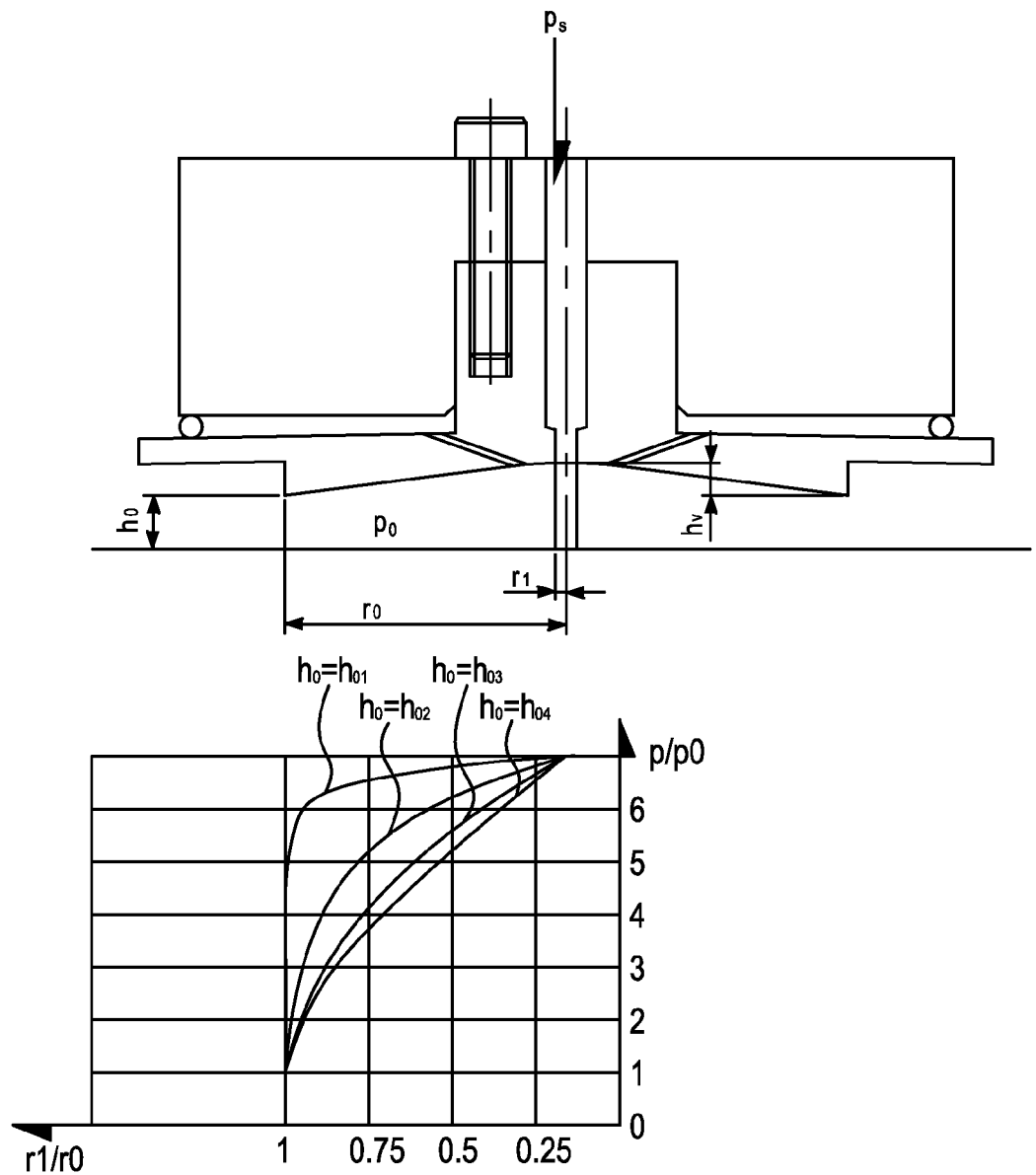
FIG. 3 is a curve diagram depicting the relative relations between the taper of a compensation unit and the oil pressure distribution in a self-compensating hydrostatic planar bearing device of the invention.

Please refer to FIG. 3, which is a curve diagram depicting the relative relations between the taper of a compensation unit and the oil pressure distribution in a self-compensating hydrostatic planar bearing device of the invention. For clarity, the parameters used in FIG. 3 is described as following:
$h_v$=height of the supporting unit, in unit of millimeter (mm), as shown in FIG. 1;
$h_0$=initial oil film gap, in unit of millimeter (mm), and $h_{01} < h_{02} < h_{03} < h_{04}$;
$P_0$=oil pressure measured when oil film gap is $h_0$, in unit of bar;
$P$=oil pressure measured when oil film gap is $h_v$, in unit of bar;
$r_0$=radius of the supporting, in unit of millimeter (mm), as shown in FIG. 1;
$r_1$=radius of the pipe in the supporting, in unit of millimeter (mm),
$i=P/P_0$, being a dimensionless scale; and
$j=r_1/r_0$, being a dimensionless scale.

Figure 4:
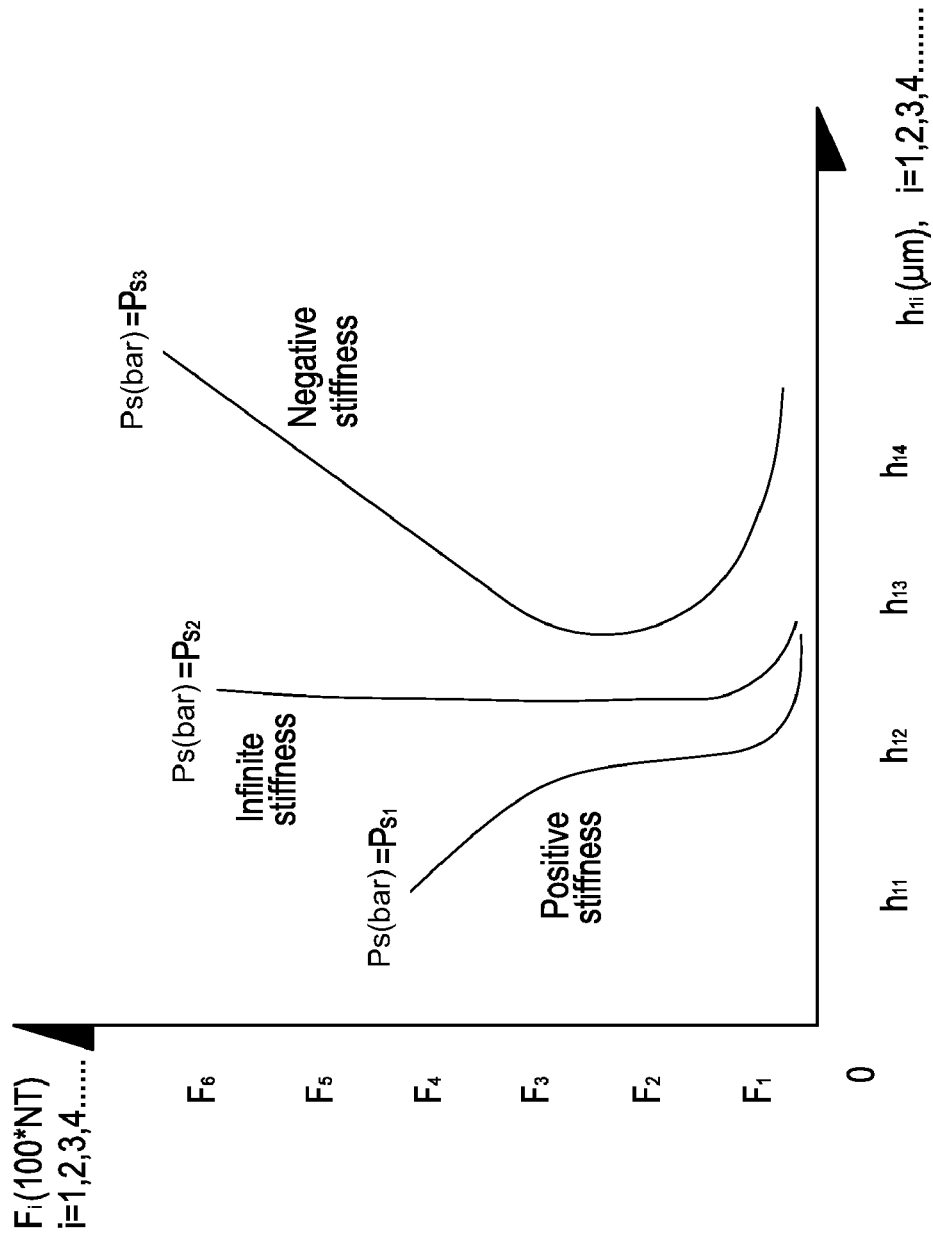
FIG. 4 is a curve diagram depicting the relative relations between load variation and oil film gap (or clearance) with regard to different stiffness setting.

Please refer to FIG. 4, which is a curve diagram depicting the relative relations between load variation and oil film gap with regard to different stiffness setting. For clarity, the parameters used in FIG. 4 is described as following:
$F_1$=load to the hydrostatic planar bearing device, in unit of 100 Nt, wherein $F_1 < F_2 < F_3 < F_4 < F_i$, i=1, 2, 3, 4, . . . ;
$P_s$=oil pressure to the hydrostatic planar bearing device, in unit of bar, wherein $P_{s1} < P_{s2} < P_{s3}$;
$h_{1i}$=oil film gap in the hydrostatic planar bearing device, in unit of μm, wherein $h_{11} < h_{12} < h_{13} < h_{14}$, i=1, 2, 3, 4, . . . .

It is noted that when the load to the aforesaid bearing device 1 is increasing, the pressure at the downstream of the pipe 13 will increase accordingly that further cause the pressure of the first chamber 14 to increase and consequently force the cone-shaped supporting unit 12 to deform in a manner that the degree of convergence relating to the oil film is increasing, i.e. the taper is increasing, as shown in FIG. 3. As the pressure distributed on the oil film is increasing with the increasing of the degree of convergence, the average pressure of the first chamber 14 is consequently increased therewith for forcing the hydrostatic planar bearing device 1 to move in a direction opposite to the aforesaid increasing load, and thus accomplishing a self-compensating process to increase the stiffness of the hydrostatic planar bearing device 1. According to the relative relations between load variation and oil film gap shown in FIG. 4, a working area with infinite stiffness for the self-compensating hydrostatic planar bearing device 1 subjecting to a comparatively large load can be found as the vertical line $P_s(bar)=P_{s2}$ shown in the about center of the FIG. 4. On the other hand, when the load to the aforesaid bearing device 1 is decreasing, the pressure at the downstream of the pipe 13 will decrease accordingly that further cause the pressure of the first chamber 14 to decrease and consequently cause the deformed supporting unit 12 to bounce back in a manner that the degree of convergence relating to the oil film is decreasing, i.e. the taper is decreasing. From the above description, it is known that the hydrostatic planar bearing device 1 of the invention is able to adjust its stiffness automatically according to deformation of its supporting unit, that is, it can adjust its stiffness in a self-compensating manner. In addition, the self-compensating hydrostatic planar bearing device of the invention can be an oil static pressure device or an aero-static device. The experiments shown in FIG. 3 and FIG. 4 are obtained using an oil static pressure device for illustration.

Moreover, by the method for self-compensating hydrostatic planar bearing device of the invention, the pressure to the first chamber is transferred to the second chamber directly through the communication holes to be used for causing the supporting unit to deform accordingly and consequently self-compensating the stiffness of the bearing device without suffering any delay in response time as those conventional bearing device did.

Figure 5:
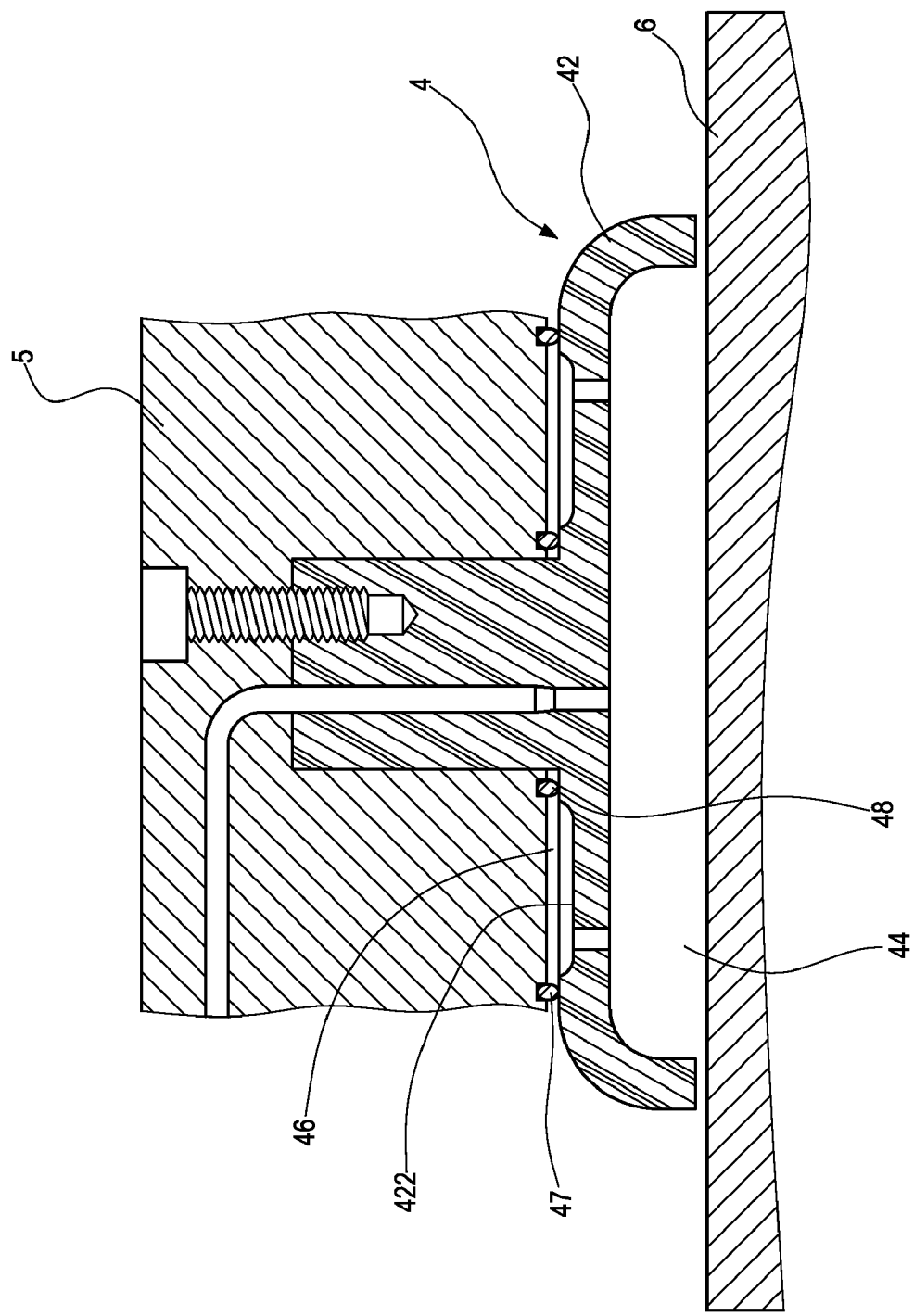
FIG. 5 is a sectional view of a self-compensating hydrostatic planar bearing device according to another embodiment of the invention.
Figure 6:
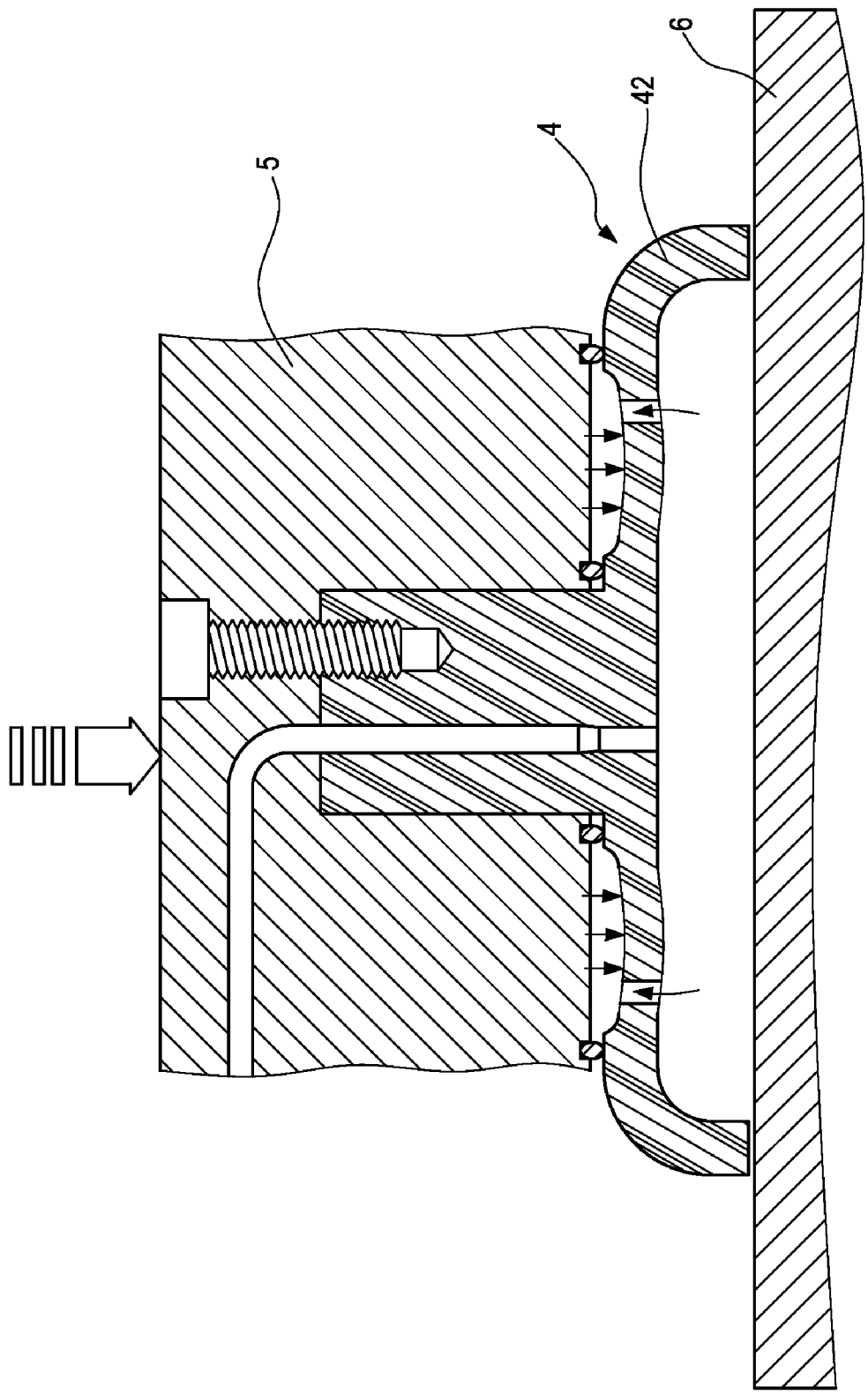
FIG. 6 is a schematic diagram illustrating how a self-compensating process is performed inside a hydrostatic planar bearing of FIG. 5 in response to an increasing load.

Please refer to FIG. 5 and FIG. 6, which is a sectional view of a self-compensating hydrostatic planar bearing device according to another embodiment of the invention; and a schematic diagram illustrating how a self-compensating process is performed inside a hydrostatic planar bearing of FIG. 5 in response to an increasing load. In this embodiment, the flexible supporting unit 42 is shaped like a disc which is configured with a first chamber 44 at a side thereof adjacent to the guide rail 6; and there is sunken ring-like recess 422 formed on the supporting unit 42 at a side thereof abutting against the slide-table 5 for forming a second chamber 46 between the recess 422 and the slide-table 5. Moreover, the second chamber 46 is insulated into an enclosed area by the use of a first sealing component 47 and a second component 48 as the two sealing components 47, 48 are respectively disposed at the two sides of the second chamber 46.

In the embodiment shown in FIG. 5, when the load to the slide-table 5 is increasing, the pressure on the hydrostatic planar bearing device 1 will narrow the oil film gap between the supporting unit 42 and the guide rail 6 and also cause the pressure of the first chamber 44 and that of the second chamber 46 to increase as well. Such pressure increasing in the second chamber 16 will force the recess 422 to deform. Similarly, as shown in FIG. 4, the shrinking first chamber 44 will generate higher average pressure to be used for increasing the stiffness of the hydrostatic planar bearing device 4. Similarly, when the load is decreasing, the stiffness of the hydrostatic planar bearing device 4 will be decreased accordingly as well.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A self-compensating hydrostatic planar bearing device, comprising:
    a flow restrictor, disposed on a slide-table in an extruding manner and configured with a flexible supporting unit having at least one communication hole formed penetrating through the flexible supporting unit, and a pipe being formed penetrating through the flow restrictor to be used for communicating the flow restrictor with an external fluid supply, wherein the flexible supporting unit is a cone-shaped structure composed of membranes;
    a first chamber, forming on an end of the flow restrictor opposite to that where the flexible supporting unit is disposed while enabling the first chamber to communicate with the pipe; and
    a second chamber, formed at a position between the supporting unit and the slide-table while allowing the second chamber to communicate with the first chamber through the at least one communication hole.

2. The self-compensating hydrostatic planar bearing device of claim 1, wherein the second chamber is insulated into an enclosed area by the use of a first sealing component and a second component as the first sealing component is disposed wrapping around the periphery of the second chamber while the second sealing component is disposed at a position between the edge of the flow restrictor and the slide-table.

3. The self-compensating hydrostatic planar bearing device of claim 1, wherein the flow restrictor is integrally formed with the flexible supporting unit.

4. The self-compensating hydrostatic planar bearing device of claim 1, wherein the flexible supporting unit is shaped like a disc.

5. The self-compensating hydrostatic planar bearing device of claim 4, wherein there is sunken ring-like recess formed on the supporting unit at a side thereof abutting against the slide-table for forming an enclosed space between the recess and the slide-table to be used as the second chamber.

6. The self-compensating hydrostatic planar bearing device of claim 5, wherein the second chamber is insulated into an enclosed area by the use of a first sealing component and a second component as the two sealing components are respectively disposed at the two sides of the second chamber.

7. The self-compensating hydrostatic planar bearing device of claim 4, wherein the second chamber is insulated into an enclosed area by the use of a first sealing component and a second component as the two sealing components are respectively disposed at the two sides of the second chamber.

8. The self-compensating hydrostatic planar bearing device of claim 1, wherein the flow restrictor is formed as a cylinder.

9. The self-compensating hydrostatic planar bearing device of claim 1, wherein the slide-table is formed with a groove at a position thereof corresponding to the flow restrictor to be provided for receiving the flow restrictor therein while enabling the flow restrictor to be fixed in the groove by a fixing part.

10. The self-compensating hydrostatic planar bearing device of claim 9, wherein the fixing part is a screw bolt.

11. A method for self-compensating hydrostatic planar bearing device, comprises steps of:
    providing a hydrostatic planar bearing device as the hydrostatic planar bearing device is comprised of: a flow restrictor, disposed on a slide-table in an extruding manner and configured with a flexible supporting unit having at least one communication hole formed penetrating through the flexible supporting unit, and a pipe being formed penetrating through the flow restrictor to be used for communicating the flow restrictor with an external fluid supply, wherein the flexible supporting unit is a cone-shaped structure composed of membranes; a first chamber, forming on an end of the flow restrictor opposite to that where the flexible supporting unit is disposed while enabling the first chamber to communicate with the pipe; and a second chamber, formed at a position between the supporting unit and the slide-table while allowing the second chamber to communicate with the first chamber through the at least one communication hole; and
    enabling the pressure to the first chamber to be changing according the variation of a load exerted upon the hydrostatic planar bearing device while transferring the pressure change to the second chamber through the communication hole for causing the flexible supporting unit to deform slightly and thereby further causing the volume of the first chamber to change so that the average pressure of the first chamber is consequently changed therewith and thus accomplishes a process for self-compensating the stiffness of the bearing.

12. The method of claim 11, wherein when the load to the hydrostatic planar bearing device is increasing, the average pressure of the first chamber is increasing therewith for causing the stiffness of the hydrostatic planar bearing device to increase accordingly.

13. The method of claim 11, wherein when the load to the hydrostatic planar bearing device is decreasing, the average pressure of the first chamber is decreasing therewith for causing the stiffness of the hydrostatic planar bearing device to decrease accordingly.

* * * * *